Feb. 16, 1954  W. D. CORLETT ET AL  2,668,966
METHOD OF MAKING SELF-LOCKING SCREWS
HAVING MISMATCHED THREADED SECTIONS
Filed Oct. 14, 1948
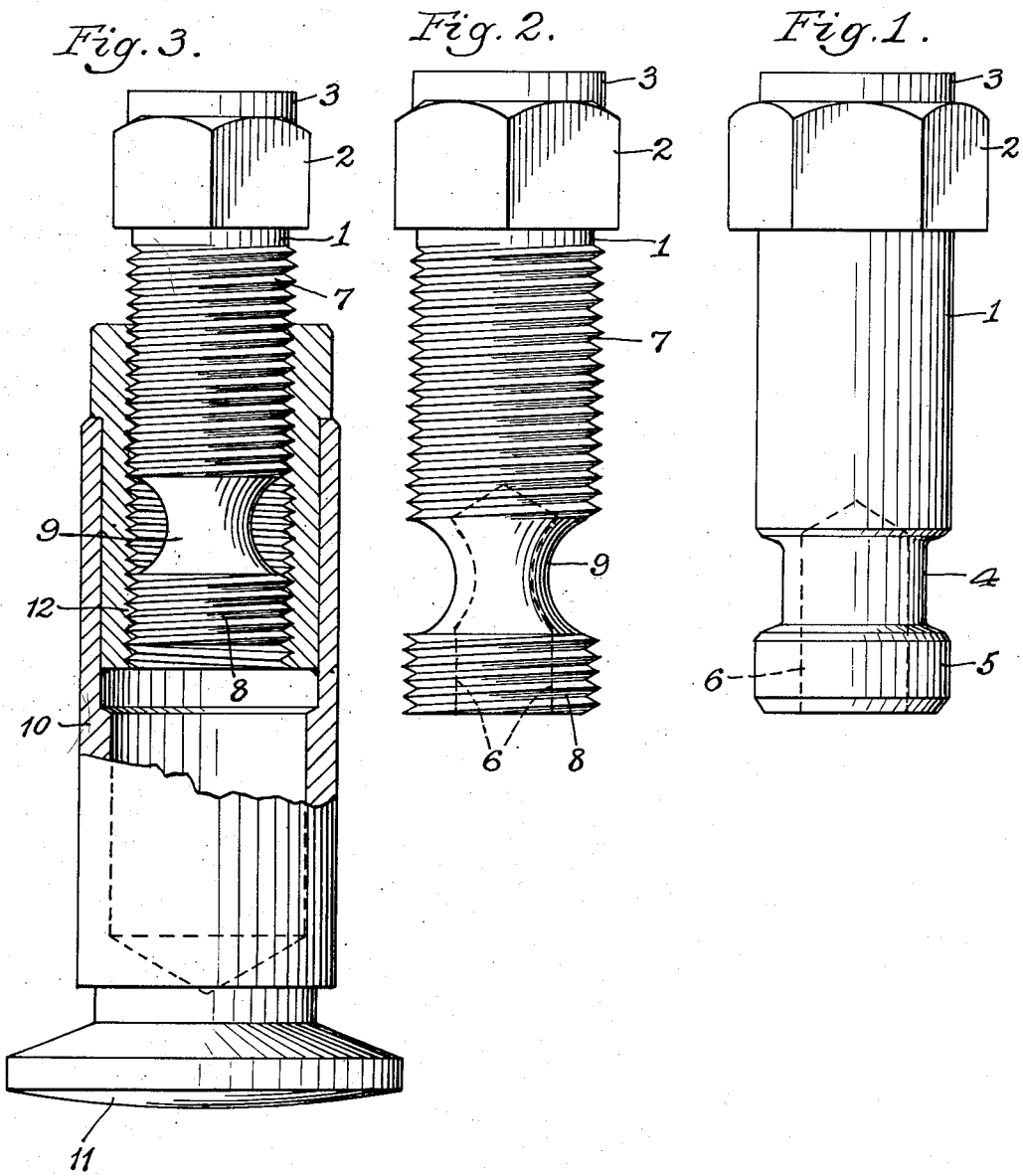
Inventors
Webster D. Corlett
Charles G. Mackie
by Parker + Carter
Attorneys.

Patented Feb. 16, 1954

2,668,966

UNITED STATES PATENT OFFICE

2,668,966

METHOD OF MAKING SELF-LOCKING SCREWS HAVING MISMATCHED THREADED SECTIONS

Webster D. Corlett, River Forest, and Charles G. Mackie, Chicago, Ill., assignors to Standard Screw Company, Hartford, Conn., a corporation of New Jersey Application October 14, 1948, Serial No. 54,554

1 Claim. (Cl. 10—27)

This invention relates to a tappet screw and has for one object to provide a self-locking tappet adjusting screw.

It has for another object to provide a unitary screw of the type indicated.

Another object is to provide a method for manufacturing such a tappet screw.

One of the objects of the invention is to provide a self-locking tappet adjusting screw which will under working conditions maintain a torque or resistance to turning which will be maintained automatically throughout the operation of the tappet.

Other objects will appear from time to time throughout the specification and claim.

The invention is illustrated more or less diagrammatically in the accompanying drawings, wherein:

Figure 1 is a side elevation of one form of a blank from which the device may be manufactured;

Figure 2 is a side elevation of the completed screw; and

Figure 3 is a section through one form of a tappet to which the self-locking screw may be applied, showing the screw in position.

Like parts are indicated by like characters throughout the specification and the drawings.

The tappet comprises initially a blank of rounded cross section which includes a main portion 1, having a head 2 of angular cross section. It may include a rounded head 3. It is reduced at 4 and includes a portion 5 of the same shape and diameter as the portion 1. A central bore 6 is formed within the blank.

After the blank is formed, as shown in Figure 1, it is threaded, the portion 1 being threaded as at 7 and the portion 5 being threaded as at 8. The reduced portion 4 is rolled or otherwise shaped inwardly, as at 9. As thus shaped it comprises a spring. The threaded portions 7 and 8 are mismatched with respect to each other. The mismatching may be produced by rolling the threads after the member 4 has been reduced to the shape 9 as shown in Figure 2. If that is done it is accomplished by the use of suitable dies which are properly spaced to accomplish mismatching.

The mismatching might be produced in any other manner. The invention is not limited, therefore, to the particular method of mismatching described. However the mismatching is produced, the spring action of the rolled-in spring section and the mismatching combine to give a uniform frictional resistance to turning in the threads of the tappet, and this friction is effective on those surfaces of the threads which are subjected to impact when the device is embodied in a tappet.

The mismatching of the thread sections 7 and 8 may also be produced by the distortion caused when the section 4 is rolled into the shape shown at 9 in Figure 2. The screw may be used in tappets of many different types and that illustrated in Figure 3 is merely shown to indicate one possible use. The invention and its use are not limited to the association with any particular device or any particular form of tappet. The tappet shown comprises a hollow barrel 10 with a head 11, and a threaded insert 12 which is fixed with relation to the barrel 10 of the tappet. The threaded sections 7 and 8 of the screw engage the threads of the insert 12. The insert 12 may be welded in place in the tappet by the hydrogen brazing process, or otherwise. If desired, the threads may be formed in the tappet body itself.

The material of the screw is preferably heat treated to give the rolled section 9 a proper spring action, and the head of the screw is preferably selectively hardened to a higher degree. Where the screw is to be used in a tappet, this is important because of the blows to which the head is subjected in use.

Although we have shown an operative form of our invention, it will be recognized that many changes in the form, shape and arrangement of parts can be made without departing from the spirit of the invention, and our showing is, therefore, to be taken as, in a sense, diagrammatic.

The use and operation of this invention are as follows:

A self-locking screw is used in a tappet or otherwise where it is necessary or desirable to provide a screw so arranged that by the construction of the screw itself the threads of the screw which are engaged are pulled downwardly into close frictional contact with the threads in the tappet or other member with which the screw is engaged.

Where the screw is applied to a tappet the threads must thus be pulled downwardly to absorb the blows to which the tappet is subjected by the valve stem. It is preferable that this pull be somewhat elastic and have sufficient spring action to give a constant pressure contact between the thread flanks, even though some wear develops on the threads. This pressure is necessary during the use of the screw to prevent its turning while in use. Also in practice in assembly it is almost impossible to have the threads always of uniform size, and this pull, therefore, is important in accomplishing satisfactory initial assembly or satisfactory replacement.

We claim:

The method of manufacturing a self-locking screw of the integral type comprising the steps of machining a screw blank with a cylindrical shank having a pair of axially spaced solid portions of substantially similar diameter interconnected by a reduced diameter solid portion, drilling a hole concentrically with the shank along its axis extending throughout the length of one of the larger diametered portions, throughout the length of the reduced diameter portion and throughout a portion of the length of the other larger diametered portion providing a thin walled annular section at the reduced diameter portion, rolling the thin walled annular section with inward radial force to provide a concaved circumferential wall portion and then rolling threads on the axially spaced larger diametered portions having an equal diameter with the helix of the thread on one portion axially displaced to the helix of the thread on the other portion.

WEBSTER D. CORLETT.
CHARLES G. MACKIE.

References Cited in the file of this patent

UNITED STATES PATENTS

| Number | Name | Date |
|---|---|---|
| Re. 20,542 | Dyer | Oct. 26, 1937 |
| 1,519,126 | Furlan | Dec. 16, 1924 |
| 2,035,055 | Dyer | Mar. 24, 1936 |
| 2,166,686 | Hoern | July 18, 1939 |
| 2,196,637 | Luce | Apr. 9, 1940 |
| 2,224,659 | Stoll | Dec. 10, 1940 |
| 2,427,560 | Johnson | Sept. 16, 1947 |